United States Patent [19]
Von Heck

[11] 3,960,437
[45] June 1, 1976

[54] QUICK ATTACHING BIKE WHEEL REFLECTOR

[76] Inventor: Robert Von Heck, P.O. Box 597, La Jolla, San Diego, Calif. 92038

[22] Filed: May 16, 1974

[21] Appl. No.: 470,634

[52] U.S. Cl. .................................................. 350/99
[51] Int. Cl.² ........................................... G02B 5/12
[58] Field of Search ............... 350/97, 99, 102, 103

[56] References Cited
UNITED STATES PATENTS

| | | | |
|---|---|---|---|
| 2,344,542 | 3/1944 | Fike | 350/99 |
| 3,781,082 | 12/1973 | Linder | 350/97 |

*Primary Examiner*—John K. Corbin
*Assistant Examiner*—Richard A. Rosenberger
*Attorney, Agent, or Firm*—Thomas Sherrard

[57] ABSTRACT

A safety-reflector device universally adaptive to spoke wheeled vehicles such as bicycles; said reflector being suitably streamlined and attractive in appearence while functioning to create a visual cyclodial pattern of highly identifiable movement during normal wheel rotation under night-time use conditions; said reflector having unique captive attachment means via rotation of wafer-like half sections about a common interconnecting point as may be centered between any two adjacent spoke members, with elongated ends overlaping thus captive spokes.

13 Claims, 5 Drawing Figures

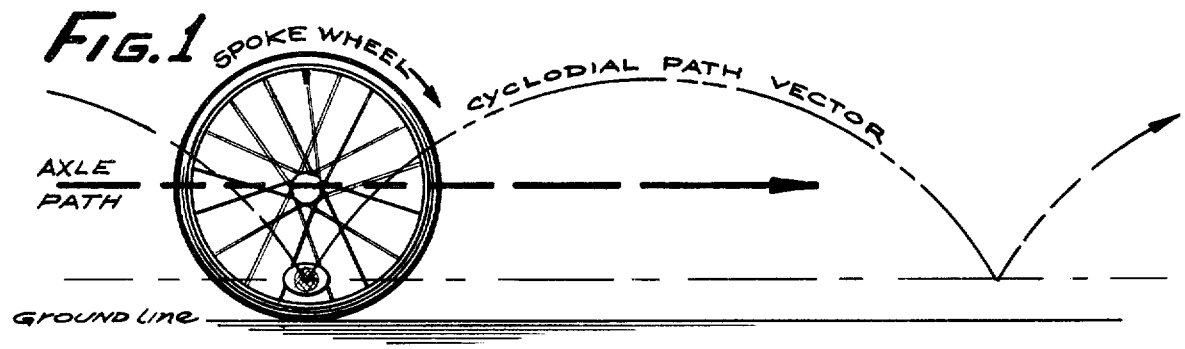
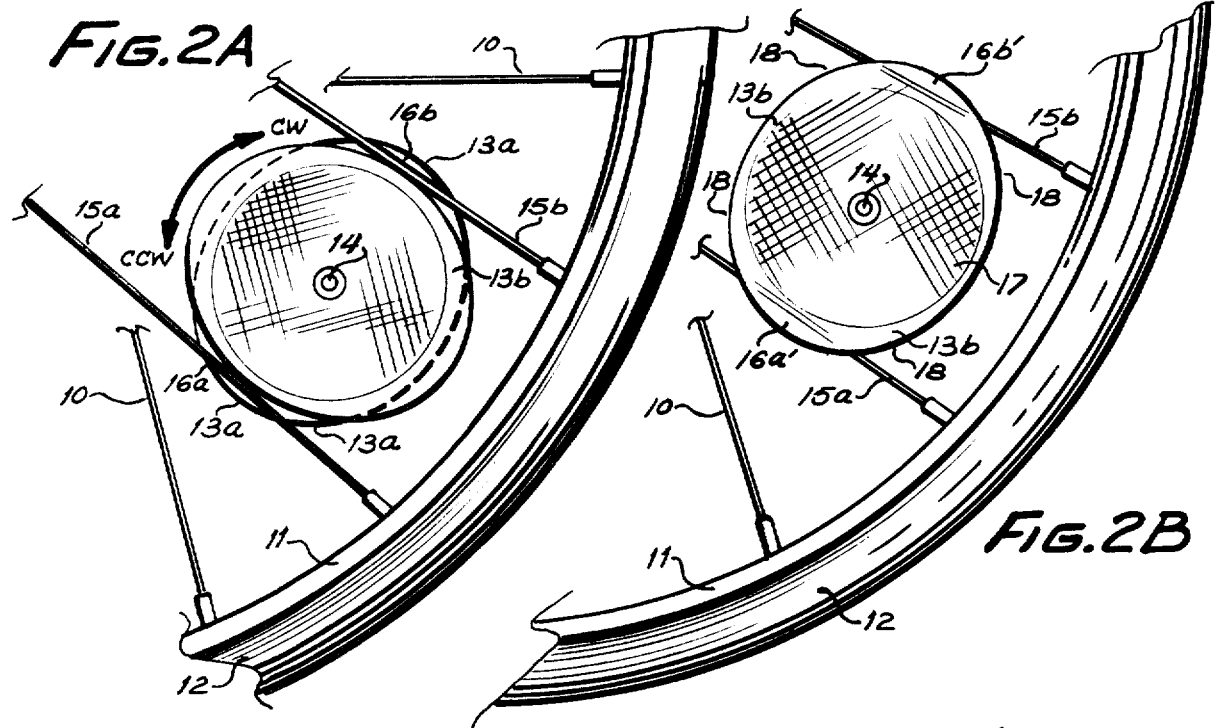
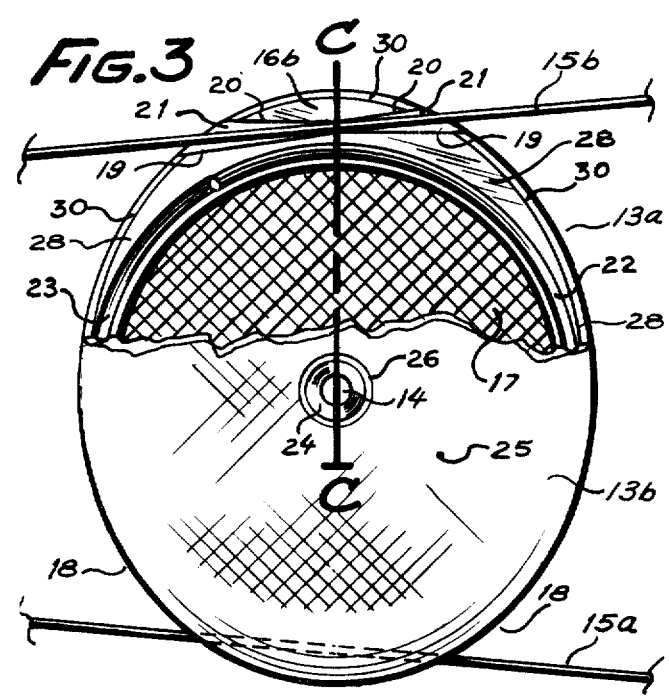
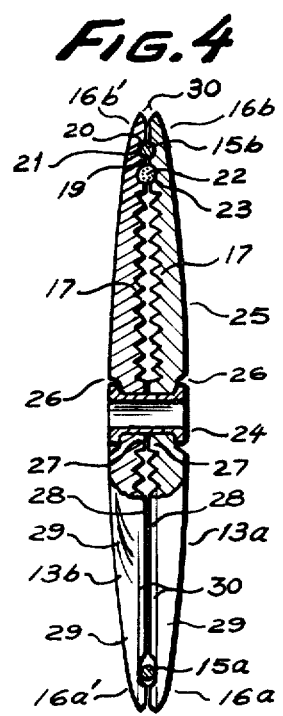

QUICK ATTACHING BIKE WHEEL REFLECTOR

This invention relates to night-time safety reflector devices used in critical lateral protective applications of importance where the vehicle has little natural reflective quality of it own, such as the traditional touring bicycle. Progress is underway by various state and federal road safety agencies to require greater lateral identity of the bicycle, and both the Dept. Of Transportation and the Society of Automotive Engineers have approved of this type of safety device as having special visual value attributal to its particular characteristic animation describing a cyclodial-pattern of traveling movement which special rotating illusion is created by the eccentric manner in which the device is mounted upon the spoke-wheel, preferably opposite the side of wheel having the usual tire/valve-stem, thereby contributing a natural counter-balance effect to the rotating assembly as well.

While efforts by others to produce a satisfactory spoke mounted reflector may be meeting safety statutes of some states, the novel reflector device herein described offers certain advantages in cost of manufacture and convenience to the user as well as improved cycling performance. Although competitive types all feature some positive means by which the reflector device may be affixed to the spoke members such as integral plastic clips or conventional screw fasteners, the invention hereof affords greater ease of installation upon the wheel achieved by a totally different means of attachment; wherein a wafer like reflector body comprised of two elongated half sections, lock upon the spoke members which are thus juxtaposed between said half-sections. Such method of attachment achieves simplicity both esthetically and functionally whereby respective halves may be derived from a common or otherwise identical injection-mold die in clear or tinted plastic; whereupon said extracted parts are mated in permanent back-to-back fashion by means of a central mechanical fastener which is the only third entity included in the preferred assemblage. Since no tools are needed for installation, the cyclodial reflector hereof shall be favored by cyclists and dealer alike, plus the preferred slight elliptical shape with smooth uncluttered surface, blends nicely with the lines of the classic 10-speed bicycle. Thus, the novel cyclodial reflector design hereof features a low projected frontal area and smooth rounded edges remiss of abrupt corners as a function of negating air-drag to a negligible factor while actually serving to provide advantages of a much larger laterally projected profile with nearly the whole of each left and right sides as installed offering reflective quality since the integral clasp provisions are but slight elongations to an essentially round wafer reflective body; additionally, the resulting ideal streamlined body produces no annoying whistling wind noises.

For reasons of literary clarity the complete invention hereof, described as a universally adaptive cyclodial type of safety reflector device shall hereinafter be referred to simply as the "Reflector";

And it is an object of this invention to provide a Reflector basically comprised of two preferably identically molded plastic elements joined back-to-back so as to provide reflective quality in both the left and right lateral side directions.

It is another object of this invention to provide a simple means of permanently joining the wafer-like Reflector elements with a single conventional mechanical fastener, such as a metal grommet or rivet.

It is another object of this invention to provide a precision molded optical quality and highly reflective integral prismoidal like surface undulations; preferably situated inwardly of the Reflector assembly hereof, so as to be protected from the effects of dust and dirt.

It is another object of this invention to provide a quick and convenient means of positive attaching the Reflector body upon any two adjacent spoke members, by simple rotational clasping arrangement.

It is another object of this invention to provide a spoke Reflector device which may be readily removed and pocketed by its owner for convenient attachment only during night-time conditions if so desired.

It is another object of this invention to provide an integral low-drag coefficient contouring to the retention portion of the Reflector body, thereby negating any unsightly visual clutter or annoying wind noise.

It is another object of this invention to ease installation by providing a chamfered entry lip contouring to critical edge regions of opposed Reflector halves merging in contact with adjacent spokes during rotation of reflector element to the locked-on position.

It is another object of this invention to provide a reflective quality in accordance with the various state and federal requirements, and which correspondingly features a maximum amount of reflective surface possibly for a round shape disposed between adjacent spoke members.

It is another object of this invention to provide mated integral spoke retension indexing-grooves within the leading and trailing ends of the Reflector body, which over-lay respective adjacent spoke members, thereby achieving positive attachment thereto.

It is another object of this invention to provide a slightly splayed orientation to the indexing-groove detents so as to accommodate a wider range of spoke wheel configurations; said wheels having different rim and/or hub diameters thereby effecting the relative "cant" or pitch of radiating spoke members.

It is another object of this invention to provide an elliptical or oval Reflector body formation as viewed in either right or left lateral directions as installed on wheel; said preferable shape being a perfect 60° ellipse within which is centered a circular reflective surface while the elongated portions of the ellipse extending therefrom serve as the novel clasping entities facilitating quick installation or removal by simple rotation of a half ellipse section relative to the mating half ellipse section, thus one half may act as the receiver portion while the cooperating half section serves to overlap the opposite side of spokes in a positive retension manner.

It is another object of this invention to provide a special peripheral dust and moisture seal entity located by means of a continuous radial groove as may be molded integrally around the internal reflective surface of each respective Reflector half section; said seal entity being preferably of the standard O-ring variety, although a continuous ridge and groove arrangement may suffice.

It is another object of this invention to provide a preload condition to the mated Reflector halves so as to insure a weather-tight seal; said preload imposed by a slightly convex cross-section whereby a common central tensioned fastener causes a compression loading of the inner peripheral surface regions.

The above and other features of this invention reside in simplicity of construction, efficient and dependable operation and in adaptability to convenient and economical manufacture. With the foregoing more prominent objects and features in mind, other points of importance may become apparent as this specification proceeds.

The invention will be more fully comprehended from the following description taken in conjunction with the accompanying drawings; wherein like characters of reference are used to designate like parts, and wherein:

FIG. 1 is a diagramatic representation of what is referred to elsewhere as a Cyclodial Rotational Pattern; wherein a typical spoke wheel is shown making one complete revolution with the eccentrically mounted Reflector path of movement thus demonstrated.

FIG. 2A is a side elevation view of the Reflector assembly as it appears being applied to a sector of a typical spoke wheel shown in lateral side-view also.

FIG. 2B is a second sequence to the precedent view wherein is shown the same objects but in a fully completed stage of installation.

FIG. 3 is a detail side-view of the complete Reflector device which has one sector of a half section element shown cut-away for purposes of clarity in revealing the internal features; and a reference cutting plane is also included.

FIG. 4 is a cross-sectional view of the preceding Reflector wherein is revealed the particular manner of mating the assembled units; and the upper sector of both mated Reflector halves are seen in cutaway fashion while the lower portion of the assembly is shown in its natural outward configuration.

Therefore, in conjunction with the preceding descriptive enumerations, reference is given to the drawing of FIG. 2A where there is exhibited a typical bicycle tire/wheel assembly of the conventional 36-spoke variety used almost universally by touring bike manufacturers, said adjoining spokes 10 laced between a central hub not shown and standard outer rim 11 upon which is mounted a tire 12, and the subject invention or Reflector assembly comprised of the preferably molded plastic half sections 13a/13b having a common pivot point 14; note here briefly that the selected mounting spokes 15a/15b seem to lay snuggly within appropriately elongated clasping portions 16a/16b of Reflector element 13a, so that as element 13b is manually caused to rotate in either clockwise(cw) or counter-clockwise(ccw) direction, said spokes are made captive within the laterally opposed walls of said respective Reflector elements as is exemplified in FIG. 2B wherein said elements are in symmetrical allignment which represents the Reflector in a normal locked-on attitude of usage which may be considered semi-permanent or entirely permanent with the light application of a chemically solvent glue such as most model-aircraft cements to points 16a/16b so as to prevent subsequent rotation and removal, or, many cyclists may prefer that the Reflector assembly remain detachable during daytime cycling but readily attached again for night-time cycling. Reference to FIG. 3 reveals many vital refinements of the design which might escape the casual observer; for example study the careful edge contouring ideally describing a 60° ellipse circle which is considered both aerodynamically clean and geometrically attractive, and may be viewed from any vantage point as harmonious with the wheel while contributing further to functionary requirements by smoothly integrating the said clasping extensions which overlap the attendant spokes without obtrusive flanges or unsightly fasteners; which virtue of simplicity also tends to befuddle would-be attempts to vandal the Reflector hereof. Note further that a major portion of the Reflector surface is devoted to its basic function of reflecting, wherein a preferably round central region 17 very nearly reaches the attendant spoke 15b seen in the cutaway region, which thereby accommodates a comparatively large 3-inch diameter reflective area more conducive to night-time safety illumination. Again, it is clearly seen how the elliptical profile results in a most ideal and concise contouring of the entire Reflector edge surface, making transition from said central reflective area at points 18 to the outer region of elongated tabs 16a/16b one of ultimate good virtue, while other shapes may be encompassed by this invention with less appropriate virtue. Also apparent in FIG. 3, respective of either leading or trailing tabs 16a/16b dependent upon assumed direction of wheel rotation, is the particular manner in which spokes 15a/15b are juxtaposed within the duly opposed half section elements of the Reflector assembly, wherein a detentive-indexing condition is facilitated by means of shallow groove like channels existing between edges 19 and 20 within which is resting spoke 15b while spoke 15a is necessarily concealed from view but indicated by presence of dotted-lines therewith for sake of clarity; and wherein is revealed a special universally adaptive formation of said receiving channels typified by recessed surface 21 which is carefully splayed toward the direction of a wheel-hub where the appropriately converging spoke members are conventionally attached; said universal adapting-channel 21 accommodating various spoke pitch settings as may be encountered among a diversity of wheel rim and hub diameter differences for example; thus, the splayed sidewalls 19 and 20 respectively, typically represent this novel means of spoke retension which is both positive by virtue of its detentive indexing action and universal by virtue of its splayed configuration; while further serving to essentially check the radial positioning of the Reflector relative to the attendant spoke members, by virtue of the inner-relationship of spoke-pitch angle to the integrally molded universal adapter-channel splay angle, thereby precluding undesirable sliding of the Reflector from the installed position toward either rim or hub if jolted badly during the jouncing of wheel over road bumps; while it should be noted here that more specific OEM-installations do not require the universal adapting provision hereof, it remains that the detentive-index provision be included if absolute positive attachment is to be preserved; Thus, cross-reference between FIG. 3 and FIG. 4 will convey the particular manner in which these features interplay.

Also revealed in FIGS. 3 and 4 is the preferred provision of a dust-seal member in the form of a standard O-ring 22 which encircles the precision reflective surface 17 and is held captive within a constant radius step or groove 23 therewith, said groove being simply a "vee" cut or semi-circular continuous channel, while similarly included within both Reflector halves.

While various types of reflective surfacing are known to be acceptable, it is preferred that the myriad three-sided prismatic surface, generally adopted in the U.S.A. as an SAE/Class-A type surface, provides a wide effective angle of reflective dispersion of high efficency, and is simply represented here by convenient cross-hatching gridwork as exemplified in FIG. 3 area 17.

Holding the opposed Reflector halves in intimate contact is a single mechanical fastener 24 which means is shown as a preferred metal grommet which is inexpensive and lends itself well to being counter-sunk flush within the otherwise smoothly contoured external surfaces 25 by means of counterbore step 26; while a desirable preloading condition may be facilitated to exist between opposed half sections 13a and 13b by an abbreviated pivot bore boss entity 27 relative to the flat outer peripheral surfaces typical of areas 28, so that as said boss entities butt in contact, a bending of the preferably convexed external surfaces contiguous with regions 29 will occur.

Another provision of this Reflector invention is a slight chamfer formation 30 leading around the outside edges of the respective half sections where said sections may otherwise come into abrubt contact with initially seated spoke members 15a/15b upon initial rotation of the yet unseated half-section toward its locked on position represented in FIG. 2B, thus easing the detentive-index action encountered with the juxtapositioning of spoke members.

While the foregoing illustrates and describes the preferred embodiments of the invention, various modifications may become apparent to those skilled in the art to which the invention relates; accordingly, it is improper to limit the invention to the disclosure made herewith, as it is desired that various equivalents may be resorted to which fall within the spirit and scope of the invention as claimed.

I claim the following:

1. A cyclodial type of bicycle-wheel safety retro-reflector assembly, comprising: a pair of similarly formed and oppositely lateral facing wafer like elements, each element respectively displaying a like optical-reflex area with a central visual axis through which visual axis said elements are physically united by a transverse joining means; the said assembly thereby achieving instant positive spoke retension means by virtue of capturing any two adjacent wheel spokes between said united elements; thus producing secure attachment and orientation so as to serve an essentially lateral mode of visual reflectivity relative to the attendant wheel.

2. A spoke mounted cycling safety device according to claim 1, wherein said positive spoke retension means employs said elements in elongated configuration, whereby thus extended portions serve in co-alignment to achieve a bilateral overlapping grip upon said captured spokes, in the installed mode of usage; while an alternate non-aligned "opened" mode accommodates instant attaching/detatching upon spokes.

3. A spoke mounted cycling safety device according to claim 2, wherein said extensions may each include flat-groove-like detentive formations within their inner-facing surfaces, said detents serving to accommodate a seating of appropriate spoke members therein, said device being thus held captive upon selected spokes as posed interjacent to said spoke elements.

4. A spoke mounted cycling safety device according to claim 3, wherein said groove entities can accommodate a greater variety of spoke-pitch angles by means of widening contiguous groove entrances to coincide with various splays of wheel spokes anticipated to be juxtaposed within said groove pattern.

5. A spoke mounted cycling safety device according to claim 3, wherein said spoke elements are aligned in the installed condition and may be made an essentially permanent attachment by optional use of chemical bonding of said respective extention portions of said elements inter-facing one another, thereby negating event of theft.

6. A spoke mounted cycling safety device according to claim 2, wherein said extended portions are formed integrally with a continuous surface radiating outward from said axis region of respective elements; the resulting unitary wafer-bodies thus defining an aerodynamically efficient oval laterally viewed profile section as installed, essentially remiss of extraneous protuberances at the various cyclodial angles of orientation during wheel rotation.

7. A spoke mounted cycling safety device according to claim 2, wherein said extended portions are formed with integral chamfered entry-lips which serve to reduce the amount of manual effort required during attachment of assembly upon said spokes, by virtue of creating a "ramp" effect in which engaging element "lips" will ease over receiving spokes toward the said co-aligned mode; thereby negating otherwise abrupt engagement at periperal edges of said extended portions coming in contact with spokes during the attachment procedure.

8. A spoke mounted cycling safety device according to claim 1, wherein said transverse joining means comprises a coaxial member stationed centrally thereto so as to permit free rotation of either said element to attain selective alignment or disalignment of an element for attaching/detaching relative to said spokes; thereby obviating need of working tools, or particular manual dexterity.

9. A spoke mounted cycling safety device according to claim 8, wherein said coaxial member can by any known axial fastening method allowing unrestricted relative rotation of said elements to approximately 90-degrees out of normally installed alignment, while retaining said elements in intimate opposed facing relationship.

10. A spoke mounted cycling safety device according to claim 1, wherein said oppositively joined elements are each formed symmetrically around a central boss or boss/axis entity radiating outward with an essentially flat retro-reflective area which is round as viewed from a lateral direction when installed; said round area being closely encircled by dust-seal means, procluding dust or moisture from collecting within void created between said joined elements.

11. A spoke mounted safety device according to claim 10, wherein said sealing means is a continuous barrier such as a protruding ridge of one said element inwardly facing a coinciding recess within the other said elements facing surface.

12. A spoke mounted safety device according to claim 10, wherein said sealing means is an O-ring like entity retained within coinciding grooves formed within each respective inner-facing element surface.

13. A spoke mounted cycling safety device according to claim 1, wherein said elements are assembled with a slight preloading of their outer mating surfaces as contiguous upon one another; said preloading achieved by virtue of slightly abbreviated internal boss entities which mate in a butting manner subsequent to the afforesaid mating, thereby achieving the specified preload condition.

* * * * *